Nov. 13, 1962   O. J. VINCENT   3,064,186
CIRCUIT CHECKER
Filed July 20, 1959

INVENTOR.
ORVILLE J. VINCENT
BY John W Adams
ATTORNEY

United States Patent Office 3,064,186
Patented Nov. 13, 1962

3,064,186
CIRCUIT CHECKER
Orville J. Vincent, Duluth, Minn.
(833 22nd Ave. N., South St. Paul, Minn.)
Filed July 20, 1959, Ser. No. 828,394
3 Claims. (Cl. 324—51)

This invention relates generally to electrical trouble shooting equipment, and pertains more particularly to a circuit checking device.

One important object of the present invention is to provide a compact circuit checking device with which a number of different electrical tests can be conveniently and quickly made.

Another object is to provide a device of the foregoing character that can be manufactured at a relatively low cost, thereby encouraging its use by home owners as well as electricians, appliance repairmen and others engaged in professional service work of an electrical nature.

A further object of the invention is to provide a circuit checker that may be plugged into any conventional electrical outlet whenever needed. In this regard, it is an aim of the invention to obviate the need for batteries that must be replaced from time to time and which of course add to the weight of trouble shooting equipment.

Still further, the invention has for an object the use of a pair of indicating lights, the energization of which and their relative brilliance are indicative of certain prevailing circuit conditions.

Yet another object is to provide a circuit tester that will present little or no shock hazard to the user.

In its more specific aspects, a circuit checker constructed in accordance with the teachings of the instant invention may be used for checking the continuity of a circuit and obtaining a relative indication as to the magnitude of the circuit's resistance. Also, it may be used for supplying voltage directly to the circuit undergoing test. Further, it may be employed to check upon the magnitude of voltage impressed upon a circuit. Still further, my circuit checker may be utilized to short out an open circuit, the device then serving as a ready shunt.

Figure 1:
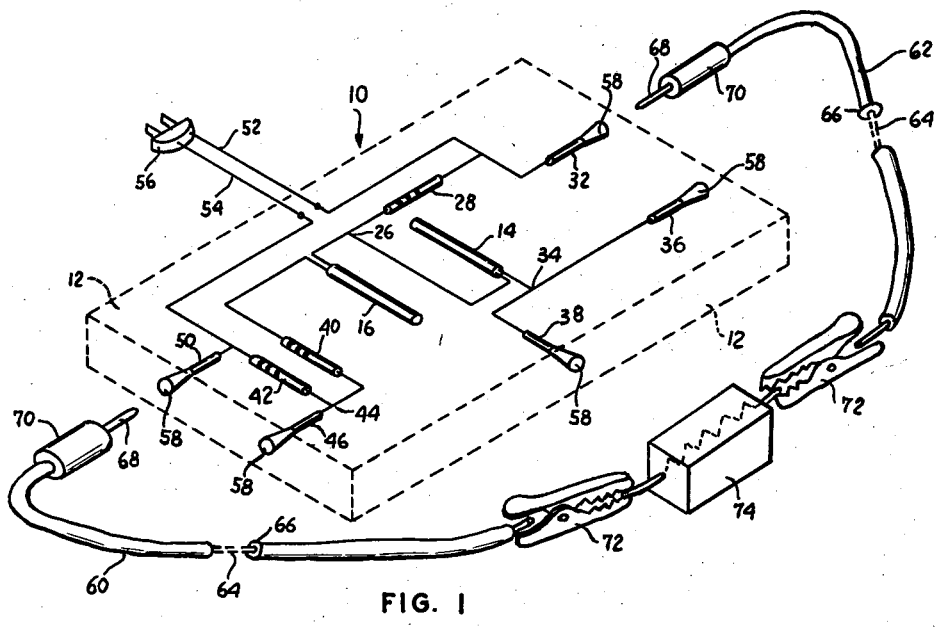
Figure 2:
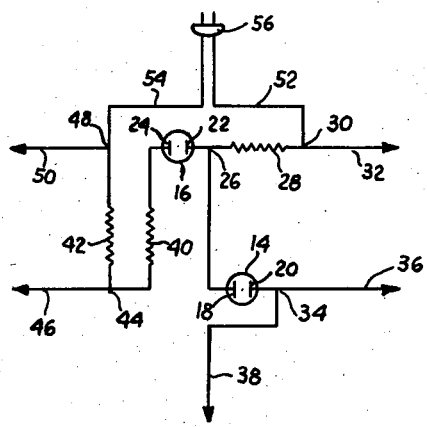

The foregoing and other objects and the means by which they may be attained will be more apparent from the following description taken in conjunction with the accompanying drawing, in which:

FIGURE 1 is a perspective pictorial view of one embodiment my circuit checker may assume, a pair of flexible leads being shown connected at one end to an electrical device the circuit of which is to be checked and their other ends in proximal relation with the two terminals into which they are to be inserted in actually conducting the test, and FIGURE 2 is a schematic diagram of the encased circuitry of FIGURE 1.

Referring now in detail to the drawing, the circuit checker there illustrating the invention has been designated generally by the reference numeral 10. The various components presently to be described are encased in a rectangular block 12 of epoxy resin which has excellent electrical insulating properties and which is sufficiently translucent for the passage of a certain amount of light, the need for which will become manifest as the description progresses. However, resins of the vinyl, polystyrene and polyethylene classes may be used, if desired.

The circuitry embedded in the block 12 comprises first and second neon glow lamps 14 and 16, the lamp 14 having a pair of electrodes 18, 20 and the lamp 16 having a pair of electrodes 22, 24. The electrodes 18 and 22 are joined together at a junction labeled 26. These lamps 14 and 16 may be of miniature proportions and need only develop a small amount of visible light. A power rating of only $\frac{1}{25}$ watt has been found completely satisfactory and capsule-type lamps this small obviously generate only an insignificant amount of heat which is easily dissipated into the comparatively massive plastic material 12 surrounding the lamps.

It will be observed that a resistor 28 has one end connected to the junction 26 and its other end to a junction 30. A metallic terminal in the form of a tubular socket 32 is electrically connected to the latter junction 30.

Attached to the electrode 20 of the lamp 14 via a junction 34 are similar terminals 36 and 38.

A second resistor 40 has one end thereof attached to the electrode 24 of the lamp 16, and a third resistor 42 is connected to the other end of said resistor 40 by way of a junction denoted by the numeral 44. The junction 44 in turn is connected to a terminal 46 which is identical to the previously mentioned ones. The other end of the resistor 42 forms a junction 48 with a terminal 50.

To the junctions 30 and 48 are connected a pair of conductors 52 and 54, these conductors leading to a conventional bayonet-type plug 56. The blades of the plug 56, of course, are intended to be inserted in a conventional 115 volt electrical outlet. Even though my device 10 is designed to be energized with 115 volts, and even 230 volts as will become apparent from the ensuing operational sequence, little or no shock hazard is present. Aiding in this safety achievement is the recessing of the various terminals or tubular sockets 32, 36, 38, 46 and 50, as indicated by the tapered entrances 58 leading inwardly from the side faces of the plastic block 12.

While the foregoing completes the description of the circuit checker 10, nonetheless it is contemplated that a pair of flexible leads 60, 62 be used in an auxiliary capacity. These leads may be of conventional construction. In their illustrated form, though, each lead includes a conductor or wire 64 sheathed in rubber or equivalent insulation 66. At one end of each lead is a pointed prong 68 projecting from a tubular sleeve 70 of insulating material. At the other end is an alligator-type clip 72.

The clips 72 of the two leads 60, 62 have been pictured in an attached relation with an electrical device 74, the circuit of which is to be tested.

It might be explained that the particular ohmic values of the resistors 28, 40 and 42 can be readily selected by those persons responsible for the design of the circuit tester 10. However, inasmuch as $\frac{1}{25}$ watt lamps 14, 16 have been mentioned, it should perhaps be stated that the resistors may be of the order of 10,000 to 50,000 ohms, particularly where the usual applied voltage will be approximately 115 volts.

Typical uses will now be presented. First, let us assume that the prongs 68 of the leads 60, 62 are inserted in the terminals or sockets 32 and 50. With the plug 56 connected to a 115 volt source, such a potential will be impressed on the device 74 which may be an electrical appliance such as a toaster, fan and the like, or for that matter any of a variety of circuits. At any rate the user can immediately tell whether the circuit is in working order by whether the device 74 functions. This is therefore a direct check.

If the circuit continuity is to be checked, then the prongs 68 are removed and inserted instead in the terminals 36 and 46. Such a connection places the resistance of the device in series with the lamp 14 and the resistor 28. The lamp 16, on the other hand, is in series with the resistor 28 plus the resistors 40 and 42 and in parallel with lamp 14 and the device. Consequently, the lower the resistance of the device 74, the more current will flow through the path containing the lamp 14 and the brighter it will glow. Concurrently with this happening will be that the lamp 16 will grow dimmer, for more and more current will be diverted from this relatively high resistive path. Therefore, the user by noting the relative brilliance of the lamps 14 and 16 will be provided with visible indication of the degree of resistance of the device 74. Obviously, the resistance contained in the device 74 does not have to be of a variable type; the user from previous experience will soon be able to discern from the relative brilliance of the lamps the approximate resistance range in which a given device falls.

If one wishes to ascertain whether a certain voltage source is, say, 115 volts or 230 volts, he would plug the prongs 68 into the terminals 38 and 46. Even though plug 56 is not used at this time, no dangerous shock hazard is present since the resistance 42 is in series with conductor 54 leading to plug 56, and resistance 40, lamp 16 plus resistance 28 are all in series with the other conductor 52 extending to the plug 56. This has the effect of placing the lamps 14, 16 and the resistor 40 in series with the voltage source. In this particular test, the device 74, is replaced with the voltage source to be measured and all other circuits within the tester have no bearing on the test since all other circuits are either open or terminate at plug 56. Consequently, if the lamps 14, 16 glow brightly, a higher voltage is being applied, whereas if they are dim such a situation will signify a lower voltage. For the assumed set of conditions, it can be easily ascertained as to whether the voltage is 115 or 230.

Sometimes it will be desirable to by-pass or short out the resistance of the device 74. This can be easily done by inserting one prong 68 in the terminal 36 and the other in the terminal 38. Because these terminals are joined together at the junction 34 the device 74 is shorted out.

While not appearing in the drawing it will be appreciated that suitable legends may be printed on or embossed into the block 12 which will be self-explanatory for carrying out any of the preceding tests.

From the foregoing, it is believed readily apparent that the illustrated circuit checker is indeed quite versatile. It is to be understood, however, that even though there is herein shown and described a preferred embodiment of the invention, the same is susceptible to certain changes fully comprehended by the spirit of the invention as herein described and within the scope of the appended claims.

What is claimed:

1. A circuit checking device comprising a single block of material enclosing all of the elements to form a versatile compact unit, said elements enclosed within said block including in combination first and second gaseous glow lamps each having a pair of electrodes with one electrode of each pair being joined together, a first resistor connected at one end to said joined electrodes, a first terminal at the other end of said resistor, a second terminal connected to the other electrode of said first lamp, a second resistor connected at one end to the other electrode of the second lamp, a third resistor having one end joined to the other end of said second resistor, a third terminal connected to the joined ends of said second and third resistors, a fourth terminal connected to the other end of said third resistor, and means for supplying electric power to said other ends of said first and third resistors, each of said terminals being readily connectable to an external circuit to be tested.

2. A circuit checking device comprising first and second gaseous glow lamps each having a pair of electrodes with one electrode of each pair being joined together, a first resistor connected at one end to said joined electrodes, a first terminal at the other end of said resistor, a second terminal connected to the other electrode of said first lamp, a second resistor connected at one end to the other electrode of said second lamp, a third resistor having one end joined to the other end of said second resistor, a third terminal connected to the joined ends of said second and third resistors, a fourth terminal connected to the other end of said third resistor, means for supplying electric power to said other ends of said first and third resistors, a block of translucent plastic material encasing all of said elements, and said terminals being recessed within said block.

3. The structure set forth in claim 2 and including another terminal connected to one of said other terminals within said block whereby a device being tested may be shorted.

References Cited in the file of this patent

UNITED STATES PATENTS

| | | |
|---|---|---|
| 2,505,177 | Falcone | Apr. 25, 1950 |
| 2,581,497 | Podell | Jan. 8, 1952 |
| 2,645,754 | Pitinsky | July 14, 1953 |
| 2,846,644 | Costello | Aug. 5, 1958 |
| 2,848,685 | Mondschein | Aug. 19, 1958 |
| 2,917,705 | Clough | Dec. 15, 1959 |
| 2,933,680 | Adams | Apr. 19, 1960 |
| 2,956,229 | Henel | Oct. 11, 1960 |